(12) United States Patent
Niu et al.

(10) Patent No.: US 9,757,864 B2
(45) Date of Patent: Sep. 12, 2017

(54) ROBOT

(71) Applicant: Seiko Epson Corporation, Tokyo (JP)

(72) Inventors: Akio Niu, Matsumoto (JP); Sho Nakano, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/867,467

(22) Filed: Sep. 28, 2015

(65) Prior Publication Data
US 2016/0089794 A1    Mar. 31, 2016

(30) Foreign Application Priority Data
Sep. 30, 2014    (JP) .................................. 2014-200031

(51) Int. Cl.
| | |
|---|---|
| B25J 17/02 | (2006.01) |
| B25J 19/00 | (2006.01) |
| F16L 3/015 | (2006.01) |

(52) U.S. Cl.
CPC ........... B25J 19/0029 (2013.01); F16L 3/015 (2013.01); *Y10S 901/27* (2013.01)

(58) Field of Classification Search
CPC ...... F16L 3/015; F16L 3/06; F16L 3/02; B25J 18/00; B25J 19/0029
See application file for complete search history.

(56) References Cited

U.S. PATENT DOCUMENTS

| | | | | |
|---|---|---|---|---|
| 6,250,174 | B1 * | 6/2001 | Terada ..................... | B25J 9/047 414/918 |
| 2004/0200304 | A1 * | 10/2004 | Matsumoto .......... | B25J 19/0029 74/490.02 |
| 2005/0189333 | A1 * | 9/2005 | Nakagiri .............. | B25J 19/0029 219/125.1 |
| 2008/0229861 | A1 * | 9/2008 | Inoue ................... | B25J 19/0029 74/490.01 |
| 2009/0114052 | A1 * | 5/2009 | Haniya ................. | B25J 9/0087 74/490.03 |
| 2009/0224109 | A1 * | 9/2009 | Hasunuma ........... | B25J 19/0025 248/52 |
| 2013/0260606 | A1 * | 10/2013 | Hahakura ............. | H01R 13/60 439/534 |
| 2014/0060233 | A1 * | 3/2014 | Gomi .................... | B25J 9/1638 74/490.05 |

(Continued)

FOREIGN PATENT DOCUMENTS

| | | |
|---|---|---|
| JP | 60-259397 A | 12/1985 |
| JP | 05-345292 A | 12/1993 |

(Continued)

OTHER PUBLICATIONS

Extended European Search Report for Application No. EP 15187082.1, dated Feb. 22, 2016 (5 pages).

*Primary Examiner* — Zakaria Elahmadi
(74) *Attorney, Agent, or Firm* — Harness, Dickey & Pierce, P.L.C.

(57) ABSTRACT

A robot includes an nth arm (n is a natural number), an (n+1)th arm rotatably supported with respect to the nth arm, and a connection destination selection part that can select a connection destination of a cable routing present inside of the nth arm from a cable routing present outside of the nth arm and a cable routing present inside of the (n+1)th arm.

6 Claims, 4 Drawing Sheets

(56) References Cited

U.S. PATENT DOCUMENTS

| | | | | |
|---|---|---|---|---|
| 2014/0067120 A1* | 3/2014 | Gomi | ...................... | B25J 9/1638 |
| | | | | 700/254 |
| 2014/0083229 A1* | 3/2014 | Kume | .................. | B25J 19/0025 |
| | | | | 74/490.02 |
| 2014/0290415 A1* | 10/2014 | Hasuo | .................. | B25J 19/0025 |
| | | | | 74/490.02 |
| 2015/0007681 A1* | 1/2015 | Murakami | ........... | B25J 19/0025 |
| | | | | 74/490.02 |
| 2015/0027262 A1* | 1/2015 | Okahisa | ................... | B25J 18/00 |
| | | | | 74/490.02 |
| 2015/0114162 A1* | 4/2015 | Kirihara | ............... | B25J 19/0029 |
| | | | | 74/490.02 |
| 2016/0089797 A1* | 3/2016 | Kawase | ................. | G01C 19/56 |
| | | | | 74/490.02 |

FOREIGN PATENT DOCUMENTS

| | | |
|---|---|---|
| JP | 06-015587 A | 1/1994 |
| JP | 2001-260068 A | 9/2001 |
| JP | 2001-260069 A | 9/2001 |
| JP | 2009-208194 A | 9/2009 |
| JP | 2010-149214 A | 7/2010 |
| JP | 2012-516783 A | 7/2012 |
| JP | 2012-218074 A | 11/2012 |
| JP | 2013-086199 A | 5/2013 |
| JP | 2013-212560 A | 10/2013 |
| JP | 2013-223923 A | 10/2013 |
| JP | 2014-140959 A | 8/2014 |
| WO | WO-2010-090360 A1 | 8/2010 |

\* cited by examiner

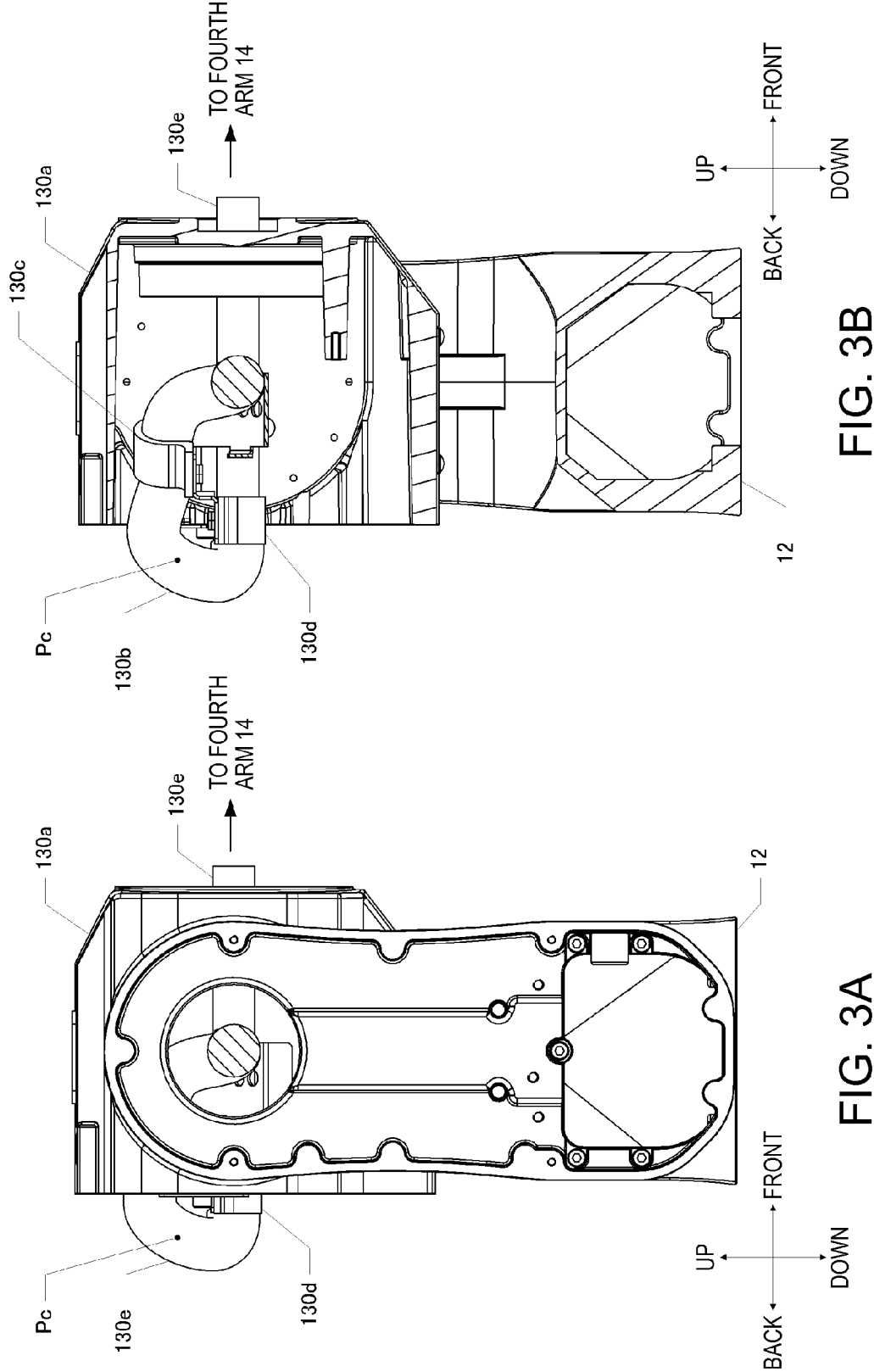

ROBOT

BACKGROUND

1. Technical Field

The present invention relates to a robot.

2. Related Art

In related art, a configuration in which a cable routing present inside of an arm of a robot is routed from a casing of the arm to the outside of the arm and connected to another part such as an end effector is known. For example, JP-A-2013-212560 discloses a configuration in which an inner cable routing and an outer cable routing are connected by a connecting part (connector) provided in an arm (JP-A-2013-212560, arm 14 in FIG. 3) that twistably supports a twisting arm (JP-A-2013-212560, arm 15 in FIG. 3).

In the above described related art, it is necessary to route the cable routing from a specific arm via the connecting part to the outside and there is no other option for routing the cable routing, and the degree of freedom for routing the cable routing is lower. Further, the connecting part is provided in the specific arm, and, if the position of the connecting part is a specific position, the range of movement of the arm may be restricted.

SUMMARY

An advantage of some aspects of the invention is at least either to provide a technology of improving the degree of freedom for routing a cable routing or to provide a technology for a connecting part for routing the cable routing to the outside not to restrict a range of movement of an arm.

A robot according to an aspect of the invention includes an nth arm (n is a natural number), an (n+1)th arm rotatably supported with respect to the nth arm, and a connection destination selection part that can select a connection destination of a cable routing present inside of the nth arm from a cable routing present outside of the nth arm and a cable routing present inside of the (n+1)th arm. That is, for routing a cable routing from an arbitrary arm to another arm, the robot is adapted so that the cable routing may be routed both outside and inside. According to the configuration, the degree of freedom for routing the cable routing may be improved.

Here, it is preferable that the nth arm and the (n+1)th arm are coupled to be rotatable relative to each other. Assuming that, of a plurality of arms, an arm that rotatably supports another arm is the nth arm, the rotating arm is the (n+1)th arm. Further, n is a natural number and the number of arms may be an arbitrary number equal to two or more. That is, the robot includes the plurality of arms and the respective arms are sequentially coupled so that the first arm to the nth arm may be sequentially counted from the end. Further, it is preferable that, in at least two of the plurality of arms, the connection destination of the cable routing present inside of one arm may be selected.

It is sufficient that the (n+1)th arm is rotatably supported with respect to the nth arm about a predetermined rotation shaft as a rotation center. An arbitrary structure can be employed for the rotatable supporting structure. For example, it is preferable that a member present over the (n+1)th arm to the nth arm and rotating about the rotation shaft as a rotation center is provided and the member is rotated by a drive unit of a motor or the like, and thereby, the (n+1)th arm may be rotated with respect to the nth arm. Obviously, another member involved with rotation, e.g. a decelerator or the like may be provided.

It is preferable that the connection destination selection part can select the connection destination of the cable routing present inside of the nth arm from the cable routing present outside of the nth arm and the cable routing present inside of the (n+1)th arm. That is, it is preferable that the connection destination selection part can transfer an object to be transferred in the cable routing present inside of the nth arm to another cable routing and select the cable routing as a transfer destination. The selection of the cable routing may be performed by attachment and detachment of the cable routing, or, in a configuration in which the cable routing present inside of the nth arm is branched to another cable routing, the branching destination can be selectable (by e.g. a switch, valve, or the like). Note that the state in which the cable routing present inside of the nth arm is connected to the cable routing present outside of the nth arm is a state in which the cable routings inside and outside are connected via a casing of the nth arm.

It is sufficient that the cable routing is a member that transfers an arbitrary object to be transferred, and the cable routing is present at least inside of the nth arm, inside of the (n+1)th arm, or outside of the nth arm. Note that, as the object to be transferred by the cable routing, various objects can be assumed, and power, signals, fluids, etc. are assumed. When power and signals are objects to be transferred, the cable routings are conductors and, when fluids are objects to be transferred, the cable routings are pipes. Obviously, the number of cable routings is more than one and the number of types of cable routings may be more than one.

When the cable routing present outside of the nth arm is set as the connection destination of the cable routing present inside of the nth arm, the cable routings present inside and outside of the nth arm are connected. This state may be realized by an arbitrary member provided between the cable routings present inside and outside of the nth arm. For example, the connection destination selection part may include a relay that can connect and detach the cable routing present inside of the nth arm to and from a cable routing communicating with the outside from the inside of the nth arm and a cable routing reaching the inside of the (n+1)th arm. That is, according to the detachable relay, a user may select the connection destination of the cable routing present inside of the nth arm extremely easily by detaching and attaching the relay.

Obviously, another member than the relay may be provided between the cable routings present inside and outside of the nth arm. For example, a connecting part (connector, joint, or the like) connecting the cable routings present inside and outside of the nth arm may be provided in the casing of the nth arm, and the cable routings present inside and outside of the nth arm may be connected via the connecting part or another cable routing may be connected between the cable routings present inside and outside of the nth arm. Further, the configuration of connecting the cable routings present inside of the (n+1)th arm and the nth arm can be realized by a relay (connector, joint, or the like) connecting the cable routings, and, obviously, another cable routing may be connected between the cable routings.

Further, the relay may include at least two connecting parts that can connect the cable routings and connection directions of the cable routings to the respective connecting parts may be different from each other. That is, in a part in which the cable routing present inside of the nth arm is connected to another cable routing, the orientation of the cable routing may largely vary. Accordingly, the cable routing inside of the nth arm is connected to another cable routing using the relay in the different connection directions of the cable routings from each other, and thereby, the orientation of the cable routing may be changed by the relay. Therefore, excessive stress on the cable routings may be prevented.

Note that it is sufficient that the relay can connect at least two cable routings and the connection directions of the respective cable routings are different from each other, and the connection directions of the respective cable routings can be adjusted in response to the orientations of the respective routed cable routings, the rotation angle of the arm, or the like. For example, when orientations of the cable routing present inside of the nth arm and the cable routing of interest are different by 90 degrees, the relay may be adapted so that the connection directions of the cable routings with respect to the relay may be at 90 degrees.

Furthermore, the (n+1)th arm may include an (n+1)th connecting part for connecting the cable routing present inside of the (n+1)th arm and a cable routing present outside of the (n+1)th arm. That is, the cable routing routed inside of the (n+1)th arm according to the selection by the connection destination selection part may be routed to the outside via the (n+1)th connecting part provided in the (n+1)th arm. According to the configuration, the user can select between the state in which the cable routing present inside of the nth arm is connected to the cable routing present outside of the nth arm and the state in which the cable routing is connected to the cable routing present outside of the (n+1)th arm.

Note that, as described above, the configuration in which the cable routing present inside of the (n+1)th arm is routed to the outside of the (n+1)th arm is employed, it is not necessary to provide the cable routing inside over the entire (n+1)th arm, and thereby, the distal end part located at the opposite side to the coupling part to the nth arm may be downsized in the (n+1)th arm. Therefore, it is preferable that apart not requiring a larger casing (e.g. an end effector, an arm that rotatably supports the end effector, or the like) is connected to the distal end part side in the (n+1)th arm.

Further, the nth arm may include an nth connecting part for connecting the cable routing present inside of the nth arm and a cable routing present outside of the nth arm, and the nth connecting part may be present within a circle having a radius as a distance between a part of the nth arm farthest from a rotation shaft of the nth arm and the rotation shaft and centered at the rotation shaft. That is, when a structure (connector, joint, or the like) for connecting the cable routing inside to the cable routing outside with respect to the nth arm is provided, the structure may interfere with objects around.

However, when the nth connecting part is provided within the circle of movement of the nth arm, the nth connecting part does not interfere with objects around outside of the circle of movement of the nth arm because the nth connecting part is provided in the nth arm. Therefore, the nth connecting part does not restrict the range of movement of the nth arm. Note that the circle of movement of the nth arm is a circle having a radius as a distance between a part of the nth arm farthest from a rotation shaft of the nth arm and the rotation shaft and centered at the rotation shaft. That is, the circle of movement of the nth arm is a range that the outermost part of the nth arm may reach by rotation when the nth arm is rotatably supported by another part (e.g. a base or another arm), and generally, the robot is driven so that the part around may not enter the range of the circle of movement. Therefore, the nth connecting part is provided within the circle of movement of the nth arm, and thereby, the nth connecting part does not interfere with objects around outside of the circle of movement of the nth arm because the nth connecting part is provided in the nth arm.

Furthermore, the nth arm may include an extra length housing part in which at least apart of an extra length portion of the cable routing present inside of the nth arm is housed, and a size of the circle having a radius as a distance between a part of the nth arm farthest from a rotation shaft of the nth arm and the rotation shaft and centered at the rotation shaft may be defined by the extra length housing part. That is, the part of the nth arm farthest from the rotation shaft of the nth arm may be the extra length housing part and the radius as the circle of movement may be defined by the extra length housing part.

The extra length housing part is provided to dispose the extra length portion of the cable routing inside of the nth arm, and is a part inevitably present in the nth arm. As described above, even when the determination of the size of the circle of movement by the extra length housing part is inevitable, the size of the circle of movement determined by the extra length housing part is not increased because the nth connecting part is provided within the circle of movement.

Further, a cable routing extending from the inside of the nth arm to the inside of the (n+1)th arm may have an extra length portion bent in an opposite direction to a direction from the nth arm to the (n+1)th arm, and then, further bent toward the (n+1)th arm.

That is, the cable routing extending from the inside of the nth arm to the inside of the (n+1)th arm is oriented directly from the nth arm to the (n+1)th arm, the cable routing has no extra length portion and excessive stress may act on the cable routing. Accordingly, the extra length portion is provided so that the cable routing may be once bent in the opposite direction to the direction from the nth arm to the (n+1)th arm, and then, further bent toward the (n+1)th arm, and thereby, even when the (n+1)th arm rotates with respect to the nth arm, excessive stress does not act on the cable routings and shortening of the period of endurance of the cable routing may be prevented.

Furthermore, the robot to which the invention is applied may be provided as a robot system including a control unit that controls the robot and cooperates with various apparatuses etc. and various configurations can be employed.

BRIEF DESCRIPTION OF THE DRAWINGS

The invention will be described with reference to the accompanying drawings, wherein like numbers reference like elements.

FIG. 3A shows the third arm and the second arm, and FIG. 3B is a sectional view of FIG. 3A.

DESCRIPTION OF EXEMPLARY EMBODIMENTS

Here, embodiments of the invention are explained in the following order.
(1) Configuration of Robot:
(2) Configuration of Connection Destination Selection Part:
(3) Other Embodiments:

(1) Configuration of Robot

Figure 1A:
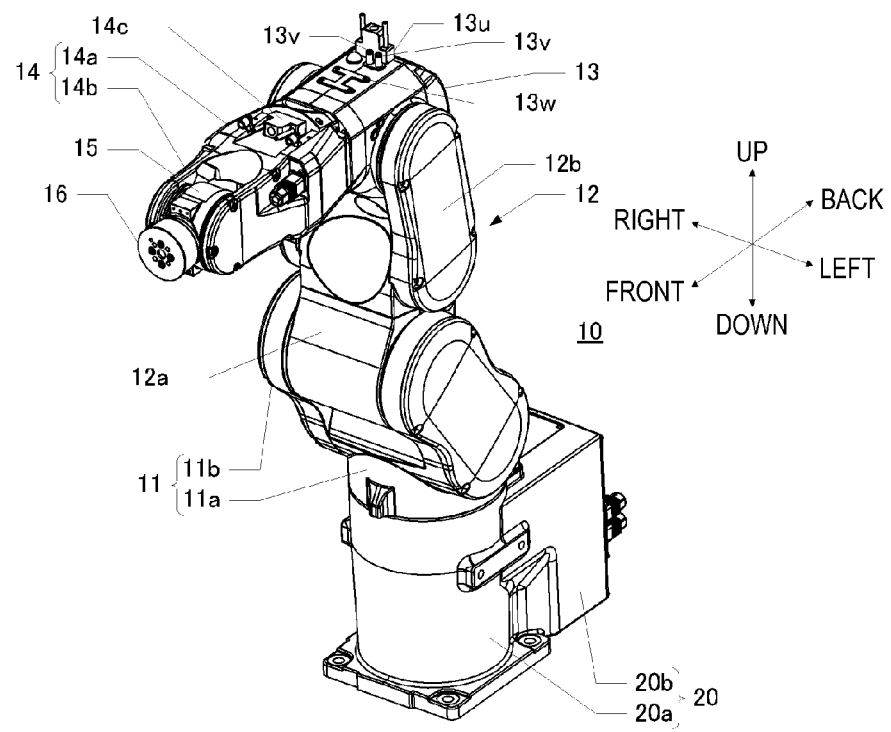
FIG. 1A shows a robot according to an embodiment of the invention.

FIG. 1A shows a configuration of a robot 10 as one embodiment of the invention. The robot 10 according to the embodiment includes a plurality of arms 11 to 16 and a base 20. In the specification, the arms are numbered sequentially from the base 20 side for distinction. That is, the first arm 11 is rotatably supported by the base 20, the second arm 12 is rotatably supported by the first arm 11. Further, the third arm 13 is rotatably supported by the second arm 12, the fourth arm 14 is rotatably supported by the third arm 13, the fifth arm 15 is rotatably supported by the fourth arm 14, and the sixth arm 16 is rotatably supported by the fifth arm 15. The rotations of the respective arms are realized by motors etc. (not shown) provided within the base 20 and the arms. Note that, in the embodiment, an end effector (not shown) may be attached to the sixth arm 16.

In FIG. 1A, the robot 10 is installed by placing the base 20 in an installation location and fastened to the installation location with bolts or the like. In the specification, directions are coordinated with directions perpendicular to the plane on which the base 20 is installed as upward and downward directions and a direction in which the main drive ranges of the respective arms present in the plane on which the base 20 is installed as a frontward direction and shown in FIG. 1A. Hereinafter, up, down, front, back, left, right are shown in reference to the directions shown in FIG. 1A.

The base 20 has a general shape in which a main body 20*a* in a nearly cylindrical shape and a rectangular part 20*b* in a rectangular shape are coupled. In FIG. 1A, the main body 20*a* is provided on the front side and the rectangular part 20*b* is provided on the back side. On the main body 20*a*, the first arm 11 is supported by the main body 20*a* so as to rotate about a rotation shaft extending in the up-to-down direction in FIG. 1A as a rotation center. The first arm 11 includes a main body 11*a* and a supporting part 11*b*, and is supported by the base 20 with the main body 11*a* disposed on the main body 20*a* of the base 20. The supporting part 11*b* is a part that sandwiches and supports the second arm 12. The second arm 12 includes a main body 12*a* and a supporting part 12*b*, and is supported by the supporting part 11*b* with the main body 12*a* sandwiched by the supporting part 11*b* so as to rotate about a rotation shaft extending in the right-to-left direction in FIG. 1A as a rotation center. The supporting part 12*b* is a part that sandwiches and supports the third arm 13.

The third arm 13 has a nearly rectangular parallelepiped shape and is supported by the supporting part 12*b* with the third arm sandwiched by the supporting part 12*b* so as to rotate about a rotation shaft extending in the right-to-left direction in FIG. 1A as a rotation center. The fourth arm 14 is supported by an end surface of the third arm (an end surface on the front side in the state shown in FIG. 1A) so that the fourth arm 14 may rotate about a rotation shaft in parallel to a direction (a front-to-back direction in the state shown in FIG. 1A) perpendicular to the rotation shaft of the third arm 13 (in the right-to-left direction in the state shown in FIG. 1A).

The fourth arm 14 includes a main body 14*a* and a supporting part 14*b*, and is supported by the third arm 13 so that the main body 14*a* may rotate about a rotation shaft extending in the front-to-back direction in FIG. 1A as a rotation center. That is, in the embodiment, the direction in which the fourth arm 14 extends and the direction in which the rotation shaft extends are in parallel and the fourth arm 14 is twistable. The supporting part 14*b* is a part that sandwiches and supports the fifth arm 15. The fifth arm 15 is sandwiched by the supporting part 14*b* and supported by the supporting part 14*b* so as to rotate about a rotation shaft extending in the right-to-left direction in FIG. 1A as a rotation center. Further, the sixth arm 16 is supported by the fifth arm 15 so as to rotate about a rotation shaft extending in the front-to-back direction in FIG. 1A as a rotation center. That is, the sixth arm 16 is also adapted to be twistable.

A plurality of the cable routings for transferring power, signals, fluids (air) to other parts can be connected to the base 20. That is, these cable routings are connected to the base 20 and the cable routings are routed inside of the base 20, and thereby, power, signals, fluids, etc. are transferred to the base 20 and an arbitrary arm of the first arm 11 to the sixth arm 16 and used.

(2) Configuration of Connection Destination Selection Part

In the embodiment, these cable routings are routed from the base 20 to the inside of the third arm 13, and, regarding the arm closer to the distal end side (arm with the higher number) than the third arm 13, a state in which the cable routing is routed inside of the arm or a state in which the cable routing is routed outside can be selected. That is, the embodiment corresponds to the case where n is three in the appended claims, i.e., the case where the nth arm is the third arm 13 and the (n+1)th arm is the fourth arm 14.

Figure 1B:
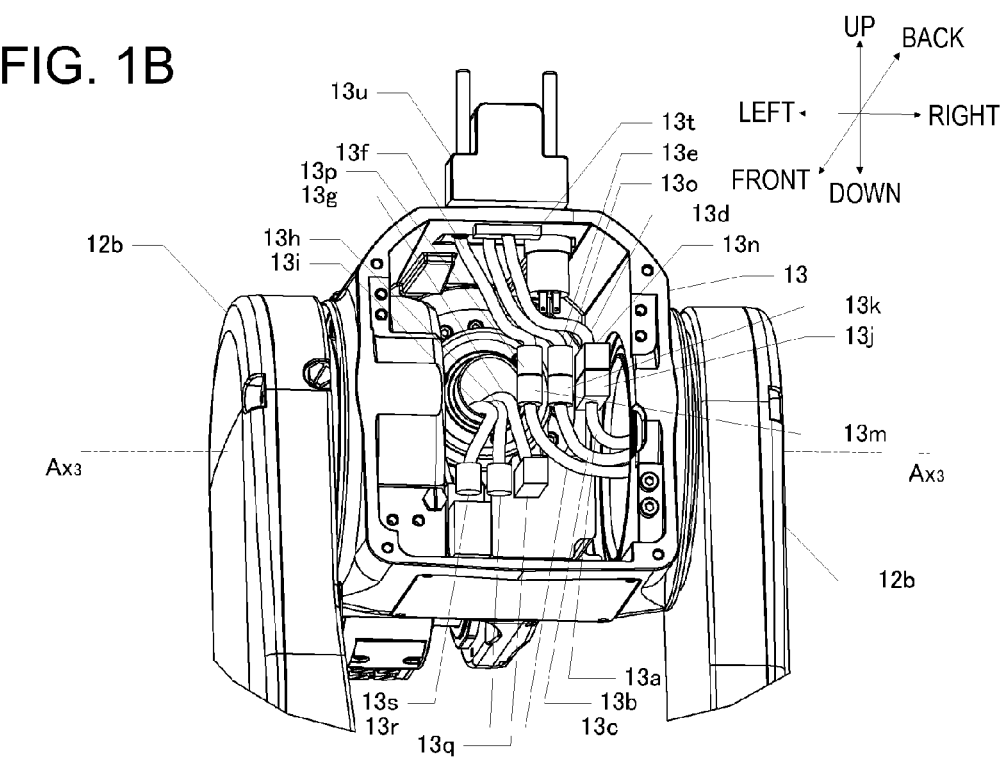
FIG. 1B shows an interior of a third arm.

FIG. 1B shows an interior of the third arm 13, and the rear casing (cover part) of the third arm 13 is detached and the third arm 13 is seen from the back side toward the front side. As shown in FIG. 1B, the third arm 13 is rotatably supported by the supporting part 12*b* of the second arm 12 and may rotate about a rotation shaft $Ax_3$ extending in the right-to-left direction as the rotation center.

Inside of the second arm 12, wires and pipes as the cable routings are routed and the cable routings are routed from the supporting part 12*b* of the second arm 12 to the inside of the third arm 13. In FIG. 1B, the cable routings routed from the supporting part 12*b* of the second arm 12 to the inside of the third arm 13 are shown by 13*a*, 13*b*, 13*c*. Note that, in the embodiment, the cable routing 13*a* includes wires for transferring signals or power and the cable routings 13*b*, 13*c* include pipes for transferring fluids (air). The ends of the cable routings 13*a*, 13*b*, 13*c* are located inside of the third arm 13 and a connector 13*j* is connected to the end of the cable routing 13*a* and joints 13*k*, 13*m* are connected to the ends of the cable routings 13*b*, 13*c*.

On the other hand, in the third arm 13, a connector 13*t* is provided in a member forming the upper casing shown in FIG. 1B, and a cable routing 13*d* including wires is connected to the connector 13*t*. A connector 13*n* is connected to the opposite end of the cable routing 13*d* to the connector 13*t*. Further, two joints 13*v* (see FIG. 1A) are attached to the member forming the upper casing of the third arm 13, and cable routings 13*e*, 13*f* including pipes are connected to the joints 13*v* (see FIG. 1B). Joints 13*o*, 13*p* are connected to the opposite ends of the cable routings 13*e*, 13*f* to the joints 13*v*.

A connector 13*u* can be connected to the connector 13*t* and a cable routing as wires (a cable routing present outside of the third arm 13) can be connected to the connector 13*u*. Note that, in FIGS. 1A, 1B, the cable routing connected to the connector 13*u* is not shown. The cable routings as pipes (the cable routings present outside of the third arm 13) can be connected to the joints 13*v*. In FIG. 1A, the cable routings connected to the joints 13*v* are not shown.

Inside of the fourth arm 14, wires and pipes as cable routings are routed and the cable routings are routed within the hollow rotation shaft member that rotatably supports the fourth arm 14. Note that the cable routings extend from the inside of the fourth arm 14 to the inside of the third arm 13, and, in FIG. 1B, the cable routings 13*g*, 13*h*, 13*i* with ends located inside of the third arm are shown. Of these cable routings 13g, 13h, 13i, the cable routing 13g includes wires and the cable routings 13h, 13i include pipes, a connector 13q is connected to the end of the cable routing 13g and joints 13r, 13s are connected to the ends of the cable routings 13h, 13i.

Inside of the third arm 13, the connector 13j can be connected to the connector 13n or the connector 13q. Further, the joints 13k, 13m can be connected to the joints 13o, 13p or the joints 13r, 13s. That is, as shown in FIG. 1B, when the connector 13j is connected to the connector 13n, the cable routing 13a present inside of the third arm 13 is connected to the cable routing outside of the third arm 13 via the connectors 13j, 13n, the cable routing 13d, and the connectors 13t, 13u. On the other hand, when the connector 13j is detached and connected to the connector 13q, the cable routing 13a present inside of the third arm 13 is connected to the cable routing 13g present inside of the fourth arm 14 via the connectors 13j, 13q.

Furthermore, as shown in FIG. 1B, when the joint 13k is connected to the joint 13o, the cable routing 13b present inside of the third arm 13 is connected to the cable routing outside of the third arm 13 via the joints 13k, 13o, the cable routing 13e, and the joint 13v. When the joint 13m is connected to the joint 13p, the cable routing 13c present inside of the third arm 13 is connected to the cable routing outside of the third arm 13 via the joints 13m, 13p, the cable routing 13f, and the joint 13v.

On the other hand, when the joint 13k is detached and connected to the joint 13r, the cable routing 13b present inside of the third arm 13 is connected to the cable routing 13h present inside of the fourth arm 14 via the joints 13k, 13r. When the joint 13m is detached and connected to the joint 13s, the cable routing 13c present inside of the third arm 13 is connected to the cable routing 13i present inside of the fourth arm 14 via the joints 13m, 13s.

As described above, according to the embodiment, the connection destination of the cable routing present inside of the third arm 13 can be selected from the cable routing present outside of the third arm 13 and the cable routing present inside of the fourth arm 14. Therefore, in the embodiment, the connectors 13j, 13n, 13q, 13t, 13u, the joints 13k, 13m, 13o, 13p, 13r, 13s, 13v, and the cable routings 13d, 13e, 13f function as a connection destination selection part that selects the connection destination of the cable routing present inside of the third arm 13.

According to the above described configuration, for routing the cable routing from the third arm 13 to the fourth arm 14, the cable routing may be routed both outside and inside. Therefore, the cable routing may be routed at the high degree of freedom. The configuration is particularly preferable in the case where the connection destination of the cable routing as wires may be selected between a first connection destination present outside of the third arm 13 and near the third arm 13 and a second connection destination present closer to the distal end than the third arm 13. The embodiment is an example of the configuration that enables the selection, and an electromagnetic valve for controlling fluid pressure can be attached to both an attachment part 13w of the casing of the third arm 13 and another part (e.g., the end effector).

Therefore, the connection destination of the pipes present inside of the third arm 13 can be selected by the connection destination selection part as in the embodiment, and thereby, the user can connect the pipes present inside of the third arm 13 to the pipes present outside of the third arm 13 and further connect the pipes present outside of the third arm 13 to the electromagnetic valve attached to the casing of the third arm 13 (first connection destination). On the other hand, the user can connect the pipes present inside of the third arm 13 to the pipes present inside of the fourth arm 14 and route the pipes present inside of the fourth arm 14 to the electromagnetic valve attached to the other part (e.g., the electromagnetic valve attached to the end effector: second connection destination).

In order to efficiently control fluid pressure by the electromagnetic valve, it is preferable that the distance between the end effector as a part using the fluid pressure and the electromagnetic valve is smaller. Therefore, in the embodiment, when the pipe is routed to the electromagnetic valve attached to the end effector, the pipe present in the fourth arm 14 may be used. However, in order to prevent interference with an object around the robot 10 or the like, it may be necessary to use a smaller end effector (an end effector to which the electromagnetic valve is not attachable). In this case, according to the embodiment, a configuration in which the electromagnetic valve is attached to the third arm 13, the pipe inside of the third arm. 13 is routed to the outside and connected and connected to the electromagnetic valve, and further, the pipe is connected from the electromagnetic valve to the end effector can be selected.

Note that, when the degree of freedom of selection of the connection destination of the cable routing is improved and the degree of freedom of routing of the cable routing is improved, the connection destination at which another part is less likely to contact with the cable routing, the connection destination at which bending of the cable routing is less necessary, the connection destination at which the angle of bending of the cable routing is smaller, or the like may be easily selected, and thereby, shortening of the period of endurance of the cable routing may be prevented.

Note that, in the embodiment, the cable routings 13d, 13e, 13f closer to the distal end than the connector 13j and the joints 13k, 13m may be regarded as cable routings communicating with the outside of the third arm 13, and the cable routings 13g, 13h, 13i closer to the distal end than the connector 13j and the joints 13k, 13m may be regarded as cable routings reaching the inside of the fourth arm 14. Therefore, the connectors 13j, 13n, 13q, joints 13k, 13m, 13o, 13p, 13r, 13s are relays that can connect and detach the cable routing present inside of the third arm. 13 to and from the cable routing communicating with the outside from the inside of the third arm 13 and the cable routing reaching the inside of the fourth arm 14. Therefore, in the embodiment, the connection destination of the cable routing present inside of the third arm 13 can be selected by the detachable relays. Accordingly, the user may select the connection destination of the cable routing present inside of the third arm 13 extremely easily by detaching and attaching the relays.

Note that, in the robot 10 according to the embodiment, a fourth connecting part for connecting the cable routing present inside of the fourth arm 14 and the cable routing present outside of the fourth arm 14 is provided in the fourth arm 14. That is, when the cable routing 13a inside of the third arm 13 is routed to the inside of the fourth arm 14 via the connectors 13j, 13q, the cable routing may be routed to the outside via the fourth connecting part provided in the fourth arm 14.

Specifically, an external connector 14c (see FIG. 1A) and an internal connector as the fourth connecting part are attached to the casing of the fourth arm 14, and the cable routing as wires present outside of the fourth arm 14 can be connected to the external connector 14c. On the other hand, inside of the fourth arm 14, the cable routing 13g routed inside of the fourth arm 14 is connected to the internal connector. Therefore, when the cable routing 13a inside of the third arm 13 is connected to the cable routing 13g by the connectors 13j, 13q and the cable routing outside of the fourth arm 14 is connected to the external connector 14c, the cable routings inside and outside of the fourth arm 14 are connected.

According to the configuration, the user can select between the state in which the cable routing 13a present inside of the third arm 13 is connected to the cable routing present outside of the third arm 13 and the state in which the cable routing is connected to the cable routing present outside of the fourth arm 14. Note that, as described above, when the configuration in which the cable routing present inside of the fourth arm 14 is routed to the outside of the fourth arm 14 is employed, it is not necessary to provide the cable routing inside over the entire fourth arm 14, and thereby, the distal end part located at the fifth arm 15 side may be downsized in the fourth arm 14. Here, the configuration in which the cable routing 13g as the wires is routed to the outside of the fourth arm 14 is explained, however, obviously, the cable routings 13h, 13i as pipes may be routed to the outside of the fourth arm 14. Further, the fourth connecting part may be adapted to be within the circle of movement of the fourth arm.

(3) Other Embodiments

The above described embodiment is an example for embodying the invention, and other various configurations can be employed. For example, the embodiment of the robot 10 is not limited to the embodiment shown in FIG. 1A, but may be any other robot such as a dual-arm robot, a humanoid robot, or a scalar robot. Obviously, the configuration of the arm is not limited to the embodiment shown in FIG. 1A. A seven-axis robot including seven arms may be employed and the number of arms is not limited. Further, in the above described embodiment, the connection destination of a cable routing present inside of an arbitrary arm may be selected between a cable routing outside and a cable routing inside of the next arm.

The connection destination selection part is not limited to the configuration of selecting the connection destination between the cable routings by attachment and detachment of the detachable relays as long as the part may select the connection destination of the cable routing present inside of the nth arm. Therefore, for example, in the above described configuration shown in FIG. 1B, in place of the connector 13j etc. and the joint 13k etc., relays for branching from the cable routing 13a to the cable routing 13d and the cable routing 13g, relays for branching from the cable routing 13b to the cable routing 13e and the cable routing 13h, or the like may be provided inside of the third arm 13, and the branching destinations of the cable routings 13a, 13b, etc. may be selected using switches, valves, or the like. According to the configuration, it is unnecessary to attach and detach the relays for selection of the connection destination.

Further, the relays as the connection destination selection part may include at least two connection parts to which the cable routings can be connected and the connection directions of the cable routings to the respective connecting parts may be different from each other. That is, in the part in which the cable routing inside of the nth arm is connected to another cable routing, the orientation of the cable routing may largely vary. For example, in the above described embodiment, when the cable routings 13b, 13c as pipes extending from the supporting part 12b of the second arm 12 to the inside of the third arm 13 are formed in linear shapes (not bent) inside of the third arm 13, the cable routings are oriented in the rotation shaft $Ax_3$ direction of the third arm 13 (i.e., the right-to-left direction shown in FIG. 1B).

Further, when the cable routings 13e, 13f connected to the joints 13v are formed in linear shapes (not bent) inside of the third arm 13, the cable routings are oriented in the up-to-down direction shown in FIG. 1B. Furthermore, when the cable routings 13h, 13i as pipes extending from the inside of the fourth arm 14 to the inside of the third arm 13 are formed in linear shapes (not bent) inside of the third arm 13, the cable routings are oriented in the rotation shaft direction of the fourth arm 14 (i.e., the front-to-back direction shown in FIG. 1B). Therefore, action of stress due to bending on these cable routings is extremely suppressed, and thereby, the respective cable routings are nearly at the right angles.

Figure 2A:
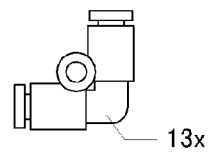
FIG. 2A shows a joint.

Accordingly, the cable routing inside of the third arm 13 is connected to the other cable routings (the cable routings 13e, 13f and the cable routings 13h, 13i) by a relay in the orthogonal connection directions of the cable routings like a relay 13x (joint) shown in FIG. 2A, and thereby, the orientation of the cable routings may be changed by the relay. Therefore, excessive stress on the cable routings may be prevented. Here, the example in which the relay 13x with respect to the cable routings as pipes bends is explained, however, obviously, the connection directions of the cable routings may be different from each other in a relay with respect to the cable routing as wires.

Figure 4:
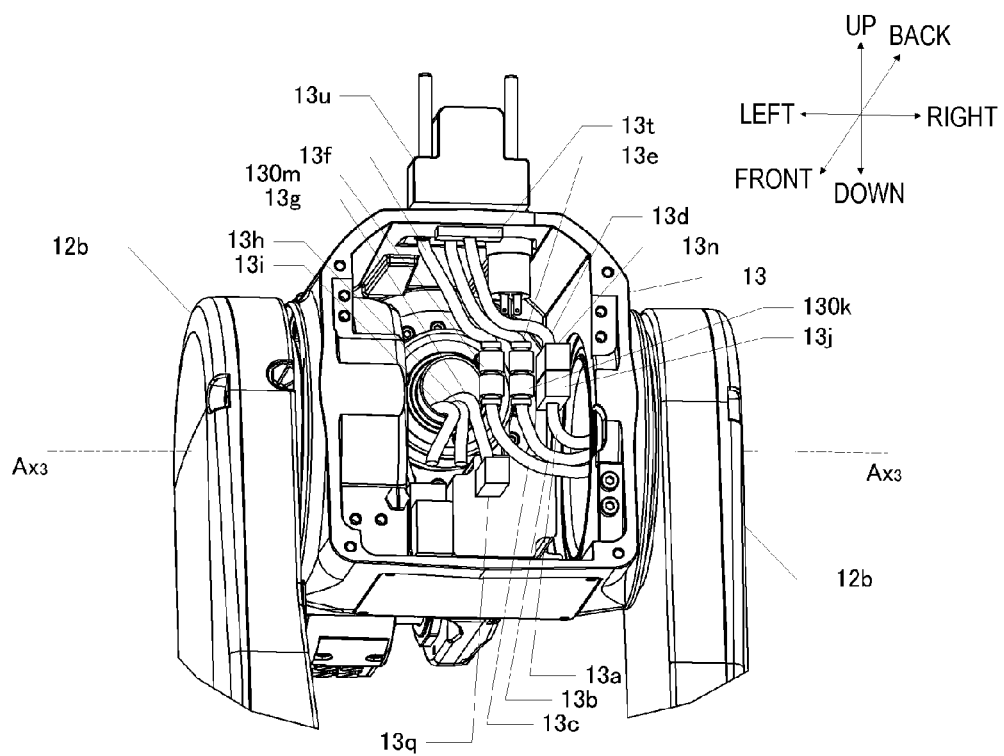
FIG. 4 shows an interior of the third arm.

Obviously, for the configuration of the relay as the connection destination selection part, other various configurations than the above described configurations can be employed. For example, two of the connecting parts that can connect the cable routings may be provided and the connection directions of the cable routings for the respective connecting parts may be in the same straight line (opposite to each other). FIG. 4 shows a configuration in which the joints 13k, 13o, 13r shown in FIG. 1B are replaced by one joint 130k and the joints 13m, 13p, 13s shown in FIG. 1B are replaced by one joint 130m. In the configuration, the cable routing 13b is connected to one connecting part of the joint 130k and the cable routing 13e or 13h is connected to the other connecting part. Further, the cable routing 13c is connected to one connecting part of the joint 130m and the cable routing 13f or 13i is connected to the other connecting part.

Figure 2B:
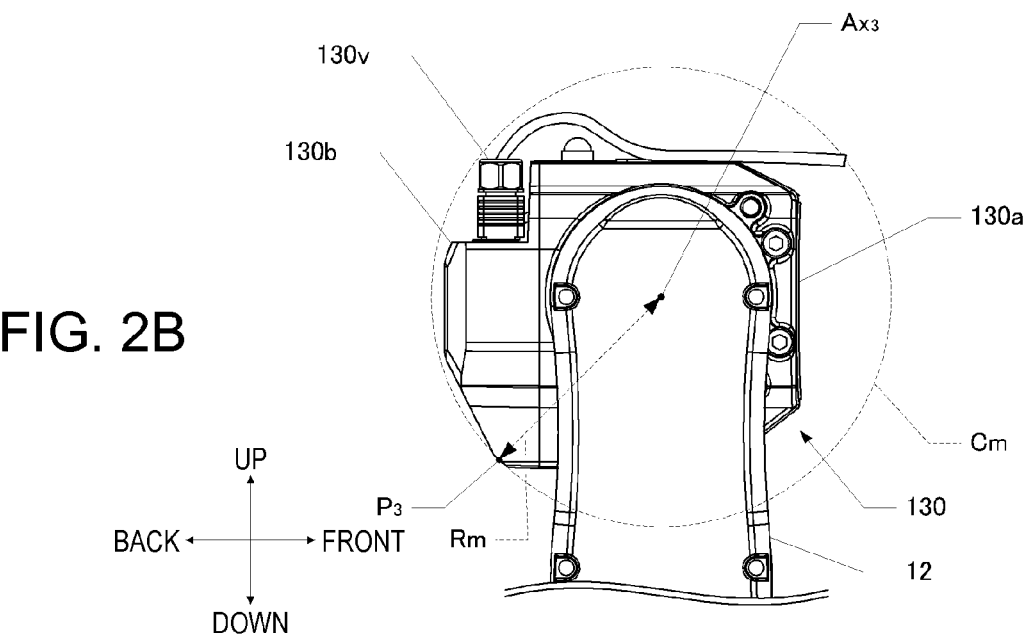
FIG. 2B shows the third arm.

Furthermore, in the nth arm adapted to select the connection destination of the cable routing present inside, the nth connecting part for connecting between the cable routing present inside of the nth arm and the cable routing present outside of the nth arm may present within a circle around the rotation shaft of the nth arm having a radius as a distance between a part farthest from the rotation shaft and the rotation shaft. FIG. 2B shows a configuration in which the casing of a third arm of the robot 10 shown in FIG. 1A is partially changed (the internal configuration is the same as that in FIG. 1B) and shows a part of a third arm 130 and the second arm 12 as seen from the right side toward the left side shown in FIG. 1A. In the embodiment, the configuration except the third arm 130 is the same as that of the embodiment shown in FIG. 1A.

The third arm 130 is formed by attachment of a hollow cover part 130b having an opening part to a hollow main body 130a having an opening part. In the embodiment, the connector 13u and the joints 13v are not provided in the upper part of the main body 130a, but provided on the cover part 130b. That is, in the state shown in FIG. 2B, the upper part of the cover part 130b is cut out compared to the corresponding part in the third arm 13 shown in FIG. 1A, the joints 130v extending from the upper part of the cover part 130b upward are attached to the cut out part as shown in FIG. 2B. Note that the connectors for connecting the cable routings as wires inside and outside are not shown.

In the embodiment, the joints 130v and the connectors (not shown) form a third connecting part that connects the cable routings inside of the third arm 130 and the cable routings outside of the third arm 130. The third connecting part including the joints 130v is present within a circle of movement Cm defined by a circle having a radius as a distance Rm between a part $P_3$ of the third arm 130 farthest from a rotation shaft of the third arm 130 and the rotation shaft $Ax_3$ of the third arm 130 and centered at the rotation shaft $Ax_3$.

Generally, when a structure (connectors, joints, or the like) for connecting the cable routings inside to the cable routings outside is provided in an arm of a robot, the structure may interfere with objects around. However, in the embodiment, the third connecting part is provided within the circle of movement Cm of the third arm 130, and thereby, the third connecting part does not interfere with objects around outside of the circle of movement of the third arm because the third connecting part is provided in the third arm 130. Therefore, the third connecting part does not restrict the range of movement of the third arm 130.

Figure 2C:
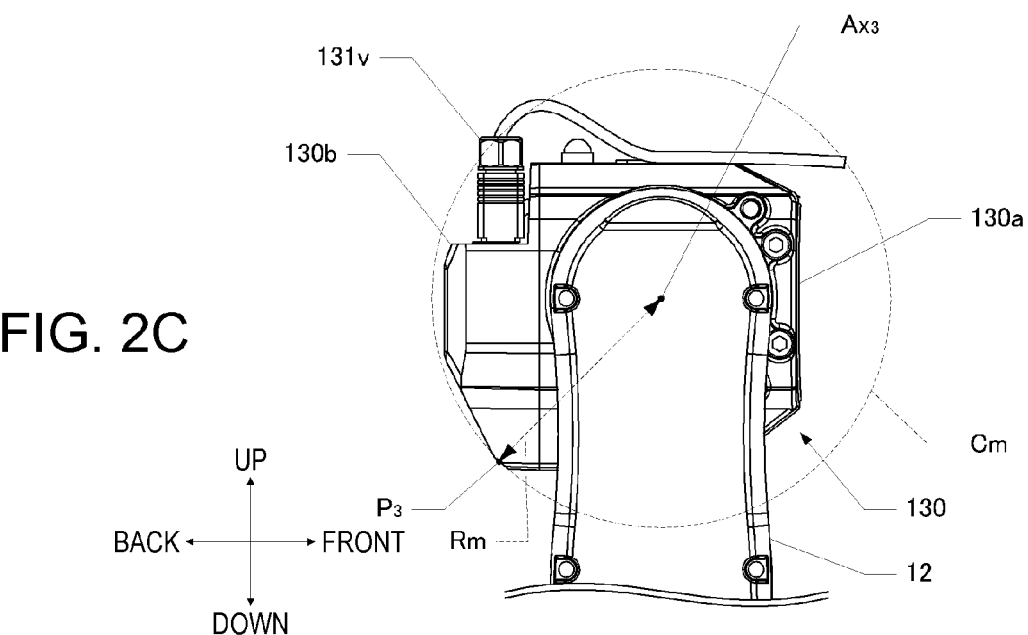
FIG. 2C shows a second arm.

Note that, if the third connecting part is present within the circle of movement of the third arm 130, the third connecting part does not interfere with objects around outside of the circle of movement of the third arm 130, however, nearly the same advantage may be obtained by a configuration in which a small portion of the third connecting part is present outside of the circle of movement of the third arm 130. FIG. 2C shows a configuration in which a small portion of the joint 131v as the third connecting part attached to the third arm 130 shown in FIG. 2B is present outside of the circle of movement of the third arm 130. Even in the configuration shown in FIG. 2C, the likelihood of the interference of the third connecting part with objects around outside of the circle of movement of the third arm is only slightly higher due to the third connecting part provided in the third arm 130. Therefore, the third connecting part may be connected to the third arm 130 while the degree of restriction of the range of movement of the third arm 130 by the third connecting part is suppressed.

Further, the nth arm may include an extra length housing part in which at least apart of an extra length portion of the cable routing present inside of the nth arm is housed. For example, the cover part 130b in the third arm 130 shown in FIG. 2B forms the extra length housing part. FIGS. 3A, 3B show the third arm 130 and the second arm 12 shown in FIG. 2B as seen from the right side toward the left side shown in FIG. 1A. In FIG. 3A, the third arm 130 is shown with the cover part 130b detached from the third arm 130 and the main body 130a left, and the second arm 12 is shown with the right casing cover of the second arm 12 detached for visual recognition of the interior of the second arm 12. Further, in FIG. 3B, the interior of the main body 130a of the third arm 130 is shown with the third arm 130 and the second arm 12 cut along a plane perpendicular to the right-to-left direction shown in FIG. 3B. Note that, in these drawings, the connection destination selection part for selection of the connection destinations is not clearly shown.

FIGS. 3A, 3B show a state in which a cable routing 130e (wires, pipes, or a bundle of them) passing through the inside of the second arm 12 is routed inside of the third arm 130 and further routed inside of the fourth arm 14 (the fourth arm 14 present on the front side of the third arm 130 is not shown). As shown in FIGS. 3A, 3B, the cable routing 130e extending from the second arm 12 to the inside of the third arm 130 is bent toward the opposite direction (the direction from front to back) to the direction from the third arm 130 to the fourth arm 14.

The bent cable routing 130e is bound inside of the third arm 130 by a binder 130c, and then, further bent in a part Pc covered by the cover part 130b and bound inside of the third arm 130 by a binder 130d. Then, the cable routing is oriented from the binder 130d toward the fourth arm 14 (oriented from back to front). As described above, the cable routing 130e is not oriented from the inside of the second arm 12 directly toward the inside of the fourth arm 14, but once bent and oriented toward the inside of the fourth arm 14, and thereby, the cable routing 130e present between the binders 130c, 130d is the extra length portion.

The cable routing extending from the inside of the third arm 130 to the inside of the fourth arm 14 is oriented from the third arm 130 directly toward the fourth arm 14, the cable routing has no extra length portion and excessive stress may act on the cable routing. However, in the embodiment, the extra length portion is provided, and thereby, excessive stress does not act on the cable routing 130e when the fourth arm 14 rotates with respect to the third arm 130 or when the third arm 130 rotates with respect to the second arm. Therefore, shortening of the period of endurance of the cable routing 130e may be prevented.

In the embodiment, the above described extra length portion is formed in the part Pc in which the cable routing 130e is covered by the cover part 130b. Therefore, the cover part 130b forms the extra length housing part that houses the extra length portion of the cable routing 130e. Further, as shown in FIG. 2B, the cover part 130b as the extra length housing part has the part defining the radius as the circle of movement, i.e., the part $P_3$ of the third arm 130 farthest from the rotation shaft $Ax_3$ of the third arm 130. Therefore, the size of the circle of movement Cm centered at the rotation shaft $Ax_3$ is defined by the cover part 130b as the extra length housing part. The extra length housing part is provided for disposing the extra length portion of the cable routing 130e inside of the third arm 130, and is a part inevitably present in the third arm 130. As described above, even when the determination of the size of the circle of movement Cm by the extra length housing part is inevitable, in the embodiment, the size of the circle of movement Cm determined by the extra length housing part is not increased because the configuration in which the third connecting part is provided within the circle of movement Cm is employed.

Note that, as the configurations shown in FIGS. 2B, 2C, 3A, 3B, the configuration in which the connection destination of the cable routing present inside of the third arm 130 can be selected between the cable routing present outside of the third arm 130 and the cable routing present inside of the fourth arm 14 is assumed, however, a configuration in which the connection destination of the cable routing is not selectable may be employed. For example, a configuration in which the third connecting part is present within the circle of movement of the third arm 130, a configuration in which the circle of movement is defined by the extra length housing part, or a configuration in which the extra length portion is provided within the third arm 130 may be applied to the configuration in which the connection destination of the cable routing is not selectable.

The entire disclosure of Japanese Patent Application No. 2014-200031, filed Sep. 30, 2014 is expressly incorporated by reference herein.

What is claimed is:

1. A robot comprising:
an arm that has a first cable routing inside of the arm and that has a second cable routing outside of the arm;
another arm that is rotatably supported by the arm and that has a third cable routing inside of the another arm; and
a connection destination selection member that is configured to select one of first and second connection states, the first connection state having the first cable routing connected to the second cable routing instead of the third cable routing, the second connection state having the first cable routing connected to the third cable routing instead of the second cable routing,
wherein the arm has a first connecting member for connecting the first cable routing and the second cable routing, and
the first connecting member is within a circle having a radius that is equal to a shortest distance between a farthest part of the arm from of a rotation axis of the arm and the rotation axis of the arm.

2. The robot according to claim 1, wherein the connection destination selection member includes a relay to connect and detach the first cable routing present inside of the arm to and from a fourth cable routing communicating with the outside from the inside of the arm and the third cable routing reaching the inside of the another arm.

3. The robot according to claim 2, wherein the relay includes at least two connecting parts to connect the third and fourth cable routings, and
connection directions of the third and fourth cable routings to the respective connecting parts are different from each other.

4. The robot according to claim 1, wherein the another arm includes a second connecting member for connecting the third cable routing present inside of the another arm and a fifth cable routing present outside of the another arm.

5. The robot according to claim 1, wherein the arm includes an extra length housing part in which at least a part of an extra length portion of the first cable routing present inside of the arm is housed, and
a size of the circle is defined by the extra length housing part.

6. The robot according to claim 1, wherein a sixth cable routing extending from the inside of the arm to the inside of the another arm has an extra length portion bent in an opposite direction to a direction from the arm to the another arm, and then, further bent toward the another arm.

* * * * *